Sept. 2, 1958 F. C. WILLIAMS 2,850,667

STORAGE OF DIGITAL INFORMATION

Filed Feb. 10, 1954 3 Sheets-Sheet 1

INVENTOR
FREDERIC C. WILLIAMS
BY
Stevens, Davis, Miller & Mosher
ATTORNEYS

Sept. 2, 1958

F. C. WILLIAMS 2,850,667

STORAGE OF DIGITAL INFORMATION

Filed Feb. 10, 1954

3 Sheets-Sheet 2

INVENTOR
FREDERIC C. WILLIAMS
BY
Stevens, Davis, Miller & Mosher
ATTORNEYS

Sept. 2, 1958    F. C. WILLIAMS    2,850,667

STORAGE OF DIGITAL INFORMATION

Filed Feb. 10, 1954    3 Sheets-Sheet 3

INVENTOR
FREDERIC C. WILLIAMS
BY
Stevens, Davis, Miller & Mosher
ATTORNEYS

United States Patent Office 2,850,667

Patented Sept. 2, 1958

2,850,667

STORAGE OF DIGITAL INFORMATION

Frederic Calland Williams, Romiley, England, assignor to National Research Development Corporation, London, England Application February 10, 1954, Serial No. 409,431

Claims priority, application Great Britain December 3, 1951

3 Claims. (Cl. 315—12)

Figure 1:
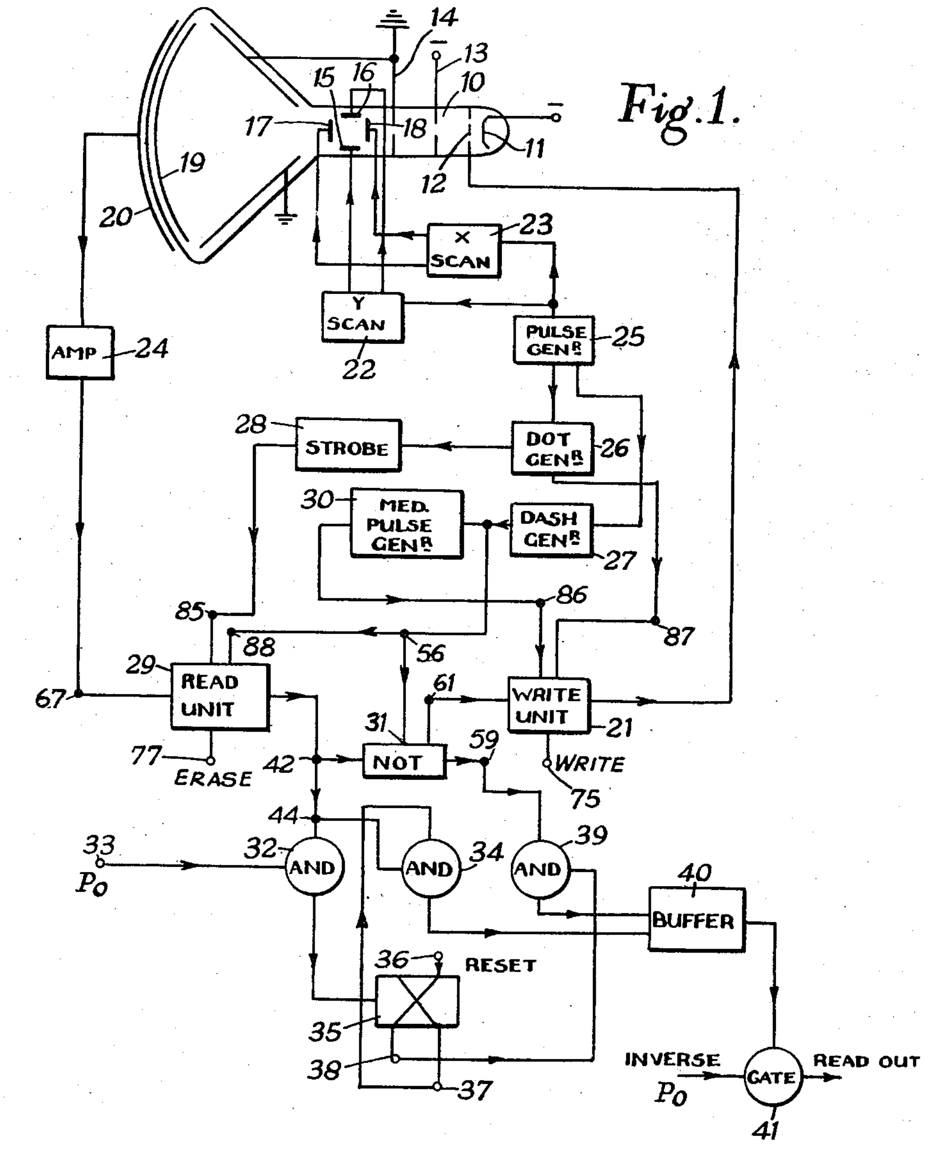

The present invention is a continuation in part of my application Serial No. 323,385, filed December 1, 1952, now abandoned, and relates to the storage of digital information.

In a known form of storage system, which is described in a paper by F. C. Williams and T. Kilburn published in "The Proceedings of the Institution of Electrical Engineers," part 3, No. 40, March 1949, and entitled "A Storage System for Use With Binary Digital Computing Machines," a cathode ray beam is caused to bombard elemental areas of a charge-retaining storage surface at a velocity such that the secondary electrons emitted exceed the primary electrons arriving, so that the charge on an elemental area so bombarded becomes relatively more positive than its initial potential; this change in the state of charge on the elemental area is counteracted when required by the nature of the information to be stored, by causing the beam to release secondary electrons from the surface to the area.

In such a system, the beam is caused to explore the storage surface and to co-operate with each of a number of discrete storage areas during corresponding digit intervals, each of which may be several, say 10, microseconds in duration. In order to record the digit "0" (for example) the beam may be switched on and caused to impinge on a selected area during what may be referred to as the dot or inspection interval, and switched off for the remainder of the digit interval, leaving the bombarded area positive relative to the potential of the rest of the storage surface. In order to record the digit "1" the beam is switched on again after the dot interval, or remains switched on, for a portion of the digit interval usually referred to as the dash or refill extension, and is directed by any convenient means to a part of the storage surface adjacent to the storage area (either outside or within the outer boundaries of the area), so that secondary electrons produced during the dash extension render the storage area less positive relative to the rest of the storage surface.

The process of reading recorded information may be identical with the process of writing the digit "0," for if the beam again falls on the elemental storage area for the dot interval, a characteristic signal is generated in a signal plate capacitively coupled to the storage surface for each "1" digit recorded. Thus if the bombarded storage area previously had no relatively positive charge (corresponding to a stored "1" digit) a positive charge is created and the characteristic signal is produced on the signal plate, whereas if the elemental storage area previously had a positive charge, the state of the charge upon the storage surface is not substantially modified, and the characteristic signal (indicative of the reading of a stored "1" digit) does not appear on the signal plate.

In such a storage system, provision is normally made for the systematic regeneration of the recorded digital information, and in a serial system, for example, in which groups of digits forming "words," representative of either numerical quantities or instructions in a computer, are recorded upon individual lines of storage areas, provision is conveniently made for access to be had to any selected line of digits for the purpose of recording or reading, or for the purpose of systematic regeneration.

As explained in the paper referred to, there is a limitation upon the closeness of spacing of adjacent lines of storage areas, because in operation, access may be had repeatedly to a single line for the purpose of reading out or writing in information, whereas access to the neighbouring lines may occur at less frequent intervals dictated only by the requirement for systematic regeneration. This so-called "action line limitation" is due to secondary electrons produced by bombardment during refill extensions tending to introduce slow variations of the mean charge level of parts of the storage surface, so that when a particular line or group of digital storage areas is repeatedly made "active," that is to say explored by the cathode ray beam for the reading or recording of information, the storage surface in the neighourhood of the active line acquires an increasing negative charge, and the regeneration of digits on these neighbouring parts of the surface is interfered with. Relatively positively charged areas recording digits in these neighbouring parts of the surface may become so affected by the rain of secondary electrons returning to the storage surface that when access is had to them for the purpose of systematic regeneration, they become regenerated as substantially uncharged areas, and recorded "0" digits thus become changed into "1" digits. It is clear that this limitation on the closeness of spacing of adjacent lines applies also to the spacing of individual digit areas in a parallel system. In practice, the spacing employed in a serial system, for example, must be such that the effect described may be tolerated even if all the digits on an active line are such that they call for bombardment during dash intervals with consequent maximum production of secondary electrons from such active line.

It is an object of the present invention to provide an electrostatic storage system in which the limitation described is reduced.

The present invention accordingly provides a binary digital electrostatic storage system in which each digit storage area may assume one of two charge conditions as a result of the liberation of secondary electrons by a cathode ray beam, wherein provision is made for the reversal of the digital significance of the charge condition upon each storage area whenever it is engaged by the cathode ray beam.

It will be apparent that if the digital significance of the two possible charge conditions is changed at every examination of any stored digit, the pattern of charges representative of any predetermined group of digits will, over an interval of time embracing several examinations, tend to comprise equal numbers of the two types of charge condition, and that so long as any predetermined group of digits is being explored the number of digit intervals during which secondary electrons are produced by bombardment during refill extensions cannot exceed one half the total number.

A storage system may readily be set up with the regeneration connections so modified that every relatively positive charge is regenerated as a substantially zero charge and vice versa, and in order to combine such a storage system with external apparatus, count is kept to determine whether or not at any one particular reading operation the digital significance to be fed to the external apparatus is "1" or a "0" should the charge condition detected by the reading operation be of one particular kind.

According to a feature of the invention, such a count is conveniently kept by associating an extra storage area with each digit storage area or group of such areas on which are recorded digits which are handled as a single word. The charge condition on this extra storage area, which reverses at every examination of the group of digits, indicates whether or not an inversion of the significance of the digits as read is required before information is fed to external apparatus. In a storage system in which groups of digits or words are recorded upon lines on the storage surface, it is convenient to allocate the first digit storage area of each storage line for the above purpose, and in a parallel system, the "tell-tale" digits are conveniently allocated to a separate store operated in parallel with the other digit stores.

Figure 2:
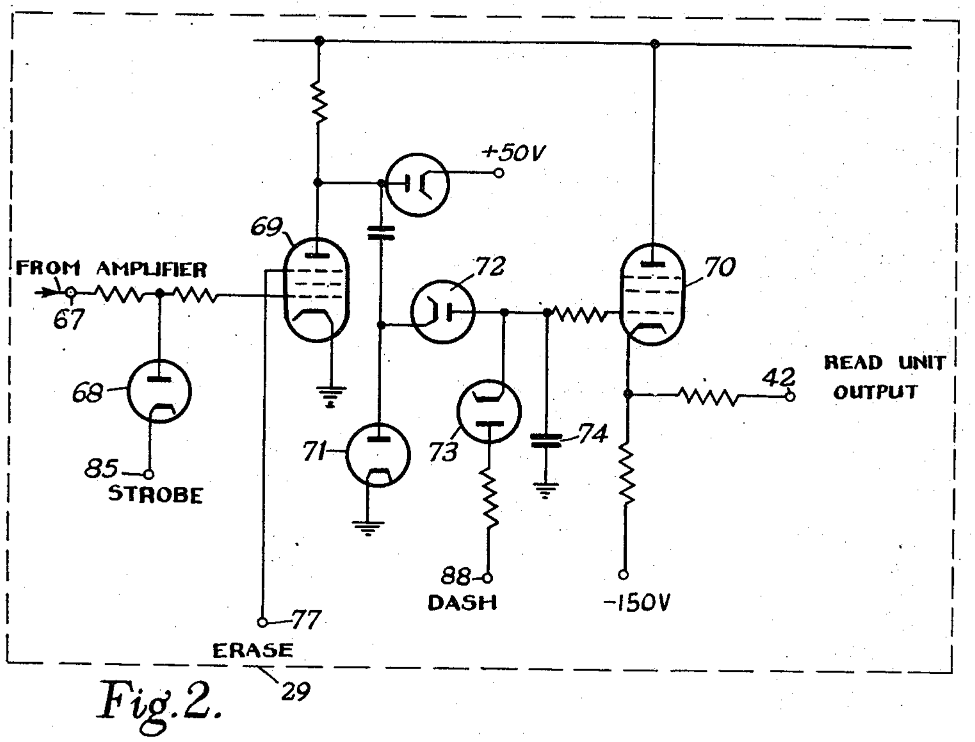
Figure 3:
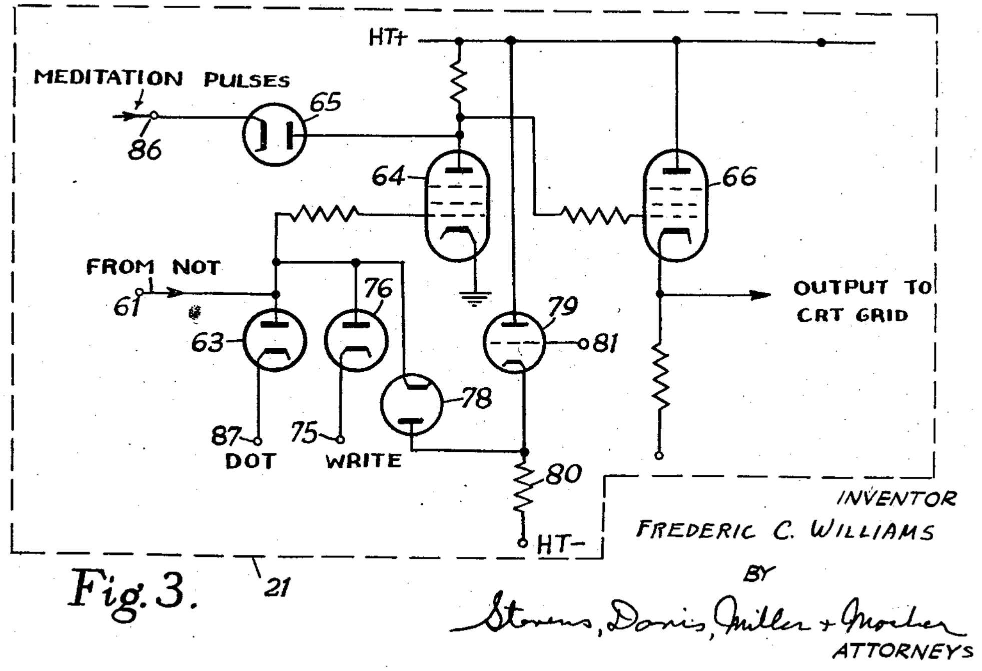
Figure 4:
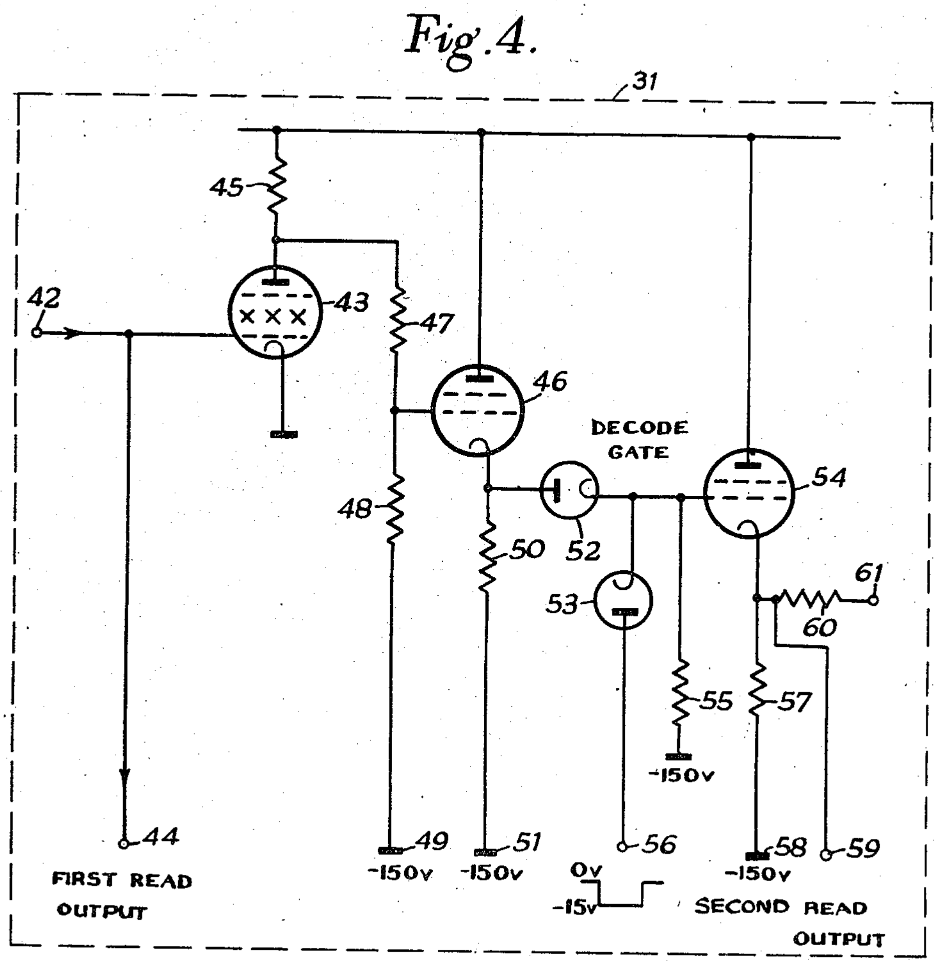

The invention will now be described by way of example with reference to the accompanying drawing in which, Figure 1 is a block schematic diagram of one embodiment of the invention, Figure 2 is a theoretical circuit diagram of a read unit shown in block form in Figure 1, Figure 3 is a theoretical circuit diagram of a write unit shown in block form in Figure 1, and Figure 4 is a theoretical circuit diagram of a Not unit shown in block form in Figure 1. Corresponding terminals in all the figures are given the same reference.

In Figure 1 a cathode ray tube 10 is provided with a cathode 11, a control grid 12, two accelerator electrodes 13 and 14, Y-deflection plates 15 and 16, X-deflection plates 17 and 18, an electrostatic charge-retaining storage surface 19, and a pick-up electrode 20. The cathode 11 is connected to the negative terminal of a source of high tension, the control grid is connected to the output of a write unit 21, the accelerator electrode 13 is connected to the source of suitable negative potential, the accelerator electrode 14 is earthed, the Y-deflection plates 15 and 16 are connected to the output of a Y-scan generator 22, the X-deflection plates are connected to the output of an X-scan generator 23 and the pick-up electrode is connected to the input of an amplifier 24.

The X- and Y-scan generators are driven from a pulse generator 25 which is also connected to, and serves to control, a dot pulse generator 26 and a dash pulse generator 27. The output of the dot pulse generator is applied through a terminal 87 to the write unit 21 and to a strobe pulse generator 28.

The output of the amplifier 24 is applied through a terminal 67 to a read unit 29 to which the output of the dash pulse generator 27 and the strobe pulse generator 28 are also applied through terminals 56 and 85 respectively. The output of the dash pulse generator 27 is also applied to a meditation pulse generator 30 whose output is applied through a terminal 86 to the write unit 21. The output of the read unit is applied through a terminal 42 to a device 31 marked Not, to be described later, a terminal 44 of an And gate 32 to which pulses are applied from a terminal 33. The output of the read unit 29 is also applied through terminal 44 to a further And gate 34. The function of And gates is to be normally closed and to open only when a control voltage is applied thereto. For example the And gate 34 is normally closed to signals from terminal 44 unless opened by a control voltage applied thereto from a terminal 37 in a manner to be described later.

Output from the And gate 32 is applied to a staticisor device 35 to which resetting pulses are applied from a terminal 36. The staticisor device may be a multivibrator of well-known type having two stable states, the device being reset in a predetermined one of these states by the resetting pulses. One output terminal 37 of the staticisor 35 is connected to apply a control voltage to the And gate 34. A second output terminal 38 of the staticisor 35 is connected to apply a control voltage to a further And gate 39. The output of the Not device 31 is applied through terminal 59 to the And gate 39 and the outputs of the two And gates 34 and 39 are applied to a buffer circuit 40. The output of the buffer circuit 40 is applied to a further gate 41 to which the pulses applied to the terminal 33 are applied in inverted form as control voltage.

The functions of the cathode ray tube 10, the generator 25, the generators 22 and 23, the amplifier 24, the dot and dash generators 26 and 27, the strobe generator 28, the meditation pulse generator 30, and the read and write units 29 and 21 may be substantially as described in the specification of co-pending patent application Serial No. 165,262, filed May 31, 1950, now Patent No. 2,769,935, issued November 6, 1956.

The read and write units 29 and 21 as disclosed in the specification of this co-pending application will be briefly described with reference to Figs. 2 and 3. Referring first to Fig. 3, negative-going dot pulses (from the generator 26 of Fig. 1) are fed from terminal 87 through a diode 63 to the control grid of a valve 64. During each dot pulse the anode current in the valve 64 is cut off and the anode voltage rises until caught by a diode 65 at a voltage of say 50 volts. The resulting positive-going pulse is applied to the control grid of a cathode-follower valve 66 and the output from the cathode of this valve is fed to the control grid (12, Figure 1) of the cathode ray tube and switches the cathode ray beam on for the duration of each dot pulse. On each digit storage area of the screen of the cathode ray tube bombarded under these conditions there is produced a positive charge which may be significant of "0" for instance.

When (as will be described later) a negative-going dash pulse appears at terminal 61, the anode current in the valve 64 is maintained cut off, after the dot pulse has ceased, for the remainder of the dash. Meditation pulses applied in negative-going sense at terminal 86 to the cathode of the diode 65 cause the cathode ray beam to be switched off for a short time at the end of the dot and the beam is again switched on, after the meditation pulse has ceased, for the remainder of the dash. Under these conditions the positive charge produced on a digit area during a dot is at least partially neutralised during the later bombardment by secondary electrons emitted from a part of the screen adjacent the digit storage area. This charge condition may be significant of "1."

When a digit area significant of "1" is again bombarded during a dot, a characteristic signal in the form of a positive-going pulse is generated on the pick-up electrode (20, Fig. 1). When a digit area significant of "0" is again bombarded during a dot, the characteristic signal referred to is not produced.

Referring to Fig. 2, when a positive-going pulse is generated on the pick-up electrode this is amplified at 24 (Fig. 1) and applied from a suitable negative rest level at terminal 67. Strobe pulses (from 28, Fig. 1) are applied at terminal 85 in positive-going sense through a diode 68. A valve 69 is arranged to have its anode current cut off unless a positive pulse from 67 is applied to its control grid at the same time as a strobe pulse when the valve is rendered conducting. The resulting negative-going pulse is applied to the control grid of a cathode-follower valve 70, the upper limit of voltage of this grid being determined by diodes 71 and 72 and the lower limit by a diode 73. Dash pulses (from 27, Fig. 1) are applied in negative-going sense from terminal 88 through the diode 73 and a condenser 74 prevents the voltage on the control grid of valve 70 from changing unless it is driven.

The result is that when a characteristic signal is applied at 67, the control grid of valve 70 is maintained negative for the duration of a dash pulse and at other times is at about zero volts. Under these conditions a negative-going dash pulse appears at terminal 42.

The voltages generated by the X- and Y-scan generators 23 and 22 in Fig. 1 may be such that the beam is caused to scan along a raster of lines over the storage surface 19 in the tube 10 and to halt at each of a plurality of positions along each line for an interval of say 10 microseconds. The initial part of each such interval coincides with a dot and the later part coincides with the dash extension. During the dash extension the beam may be directed, for example by deflecting it slightly in a direction at right angles to the line direction of scanning, to a part of the storage surface adjacent the digit storage area from which secondary electrons are released to the digit storage area.

As has been described, the signals generated in the pick-up plate 20 are fed through the amplifier 24 to the input of the read unit 29 at terminal 67. For each characteristic signal applied to the read unit 29 a dash pulse appears at the output thereof and is applied through terminal 42 to the Not device 31. If during a digit interval no characteristic signal is applied to the read unit, the read unit provides no output. The Not device is arranged, as will be described later, in such a manner that if during a digit interval a dash pulse is applied thereto from the read unit the output of the Not device remains at zero and that if during a digit interval no voltage is applied thereto from the read unit the Not device provides a dash pulse at its output. The output of the Not device is applied through terminal 61 to the write unit 21 and hence whenever a signal characteristic of a stored digit "1" is produced in the pick-up plate 20 the beam in the tube 10 is caused to produce charge conditions representative of the digit "0" on the elemental area producing the characteristic signal and vice-versa.

The device Not shown at 31 in Fig. 1 may be as shown in Fig. 4 of the accompanying drawings. The output from the read unit 29 of Fig. 1 is applied at a terminal 42 in Fig. 4. This terminal is connected to the control grid of a pentode valve 43 and to a first read output terminal 44. The pentode 43 has an anode load resistor 45 and functions as a phase inverter, the anode of the pentode 43 being directly coupled to the control grid of a further valve by means of a resistor 47 connected between the anode of the pentode 43 and the control grid of the valve 46 and a resistor 48 connected between the control grid of the valve 46 and a terminal 49 maintained at a potential of −150 volts. The valve 46 has a cathode load resistor 50 and functions as a cathode follower. The end of the resistor remote from the cathode of the valve 46 is connected to a terminal 51 maintained at a potential of −150 volts.

The voltages appearing at the cathode of the valve 46 are applied to the anode of a diode 52 whose cathode is connected to the cathode of a further diode 53 and to the control grid of a further valve 54. The control grid of the valve 54 is connected through a resistor 55 to a source of negative bias of −150 volts and the anode of the diode 53 is connected to a terminal 56 to which the dash waveform from the generator 27 in Fig. 1 is applied, the dash pulses being applied to this terminal in a negative-going sense.

The further valve 54 has a cathode load resistor 57 connected to a terminal 58 maintained at a potential of −150 volts, and functions as a cathode follower. The cathode of the valve 54 is connected directly to a second read output terminal 59 and through a resistor 60 to a terminal 61 which is connected to the input of the write unit 21 in Fig. 1.

In operation the diode 53 is normally conducting and the diode 52 is non-conducting. On the application of a negative-going dash pulse from the terminal 56 to the anode of the diode 53, the control grid of the valve 54 and hence the output terminals 59 and 61 go negative whereby the dash pulse is reproduced at these terminals. These conditions exist so long as there are no dash pulses applied to the terminal 42 from the read unit. If a dash in the negative-going sense is applied to the terminal 42 from the read unit the polarity of this pulse is inverted by the inverter 43 and hence appears in the positive-going sense at the anode of the diode 52. This serves to render the diode 52 conducting and hence to clamp the control grid of the valve 54, preventing the transmission of the dash pulse occurring at the terminal 56 to the output terminals 59 and 61.

Referring again to Fig. 1, it will be apparent that signals of the correct significance for application to external apparatus can be had from the input and output respectively of the device Not during alternate examinations. The outputs from the reading unit 29 and the device Not are therefore combined in the "buffer" 40 after passing through the And gates 34 and 39 respectively. And gates 34 and 39 are conditioned to pass signals alternately by the output of staticisor device 35 operating in dependence on the nature of the output of the reading unit. For the control of the staticisor, the output from the reading unit is fed to the And gate 32, which is also fed with recurrent $P_0$ pulses, the nature and usual functions of which are described in the specification of co-pending patent application Serial No. 141,176, filed January 30, 1950, now Patent No. 2,755,994, issued July 24, 1956. Thus a $P_0$ pulse may be a dash pulse timed to occur, in the case of series operation, during the exploration of the first digit storage area in each word.

The output from the gate 32 is used to trigger the staticisor device 35 which is reset when necessary, usually at the end of each line-scan period, by an appropriate wave form such as the line-scan black-out waveform applied at 36. Thus when a positive charge exists upon the first digit storage area on a line, no dash output is fed from the read unit 29 to the gate 32 and, consequently, in spite of the presence of a $P_0$ pulse at 33, the staticisor device 35 remains in its reset condition, whereby the gate 34 is open and the output of the buffer 40 is obtained from the reading unit 29. When the charge upon the first digit storage area is zero (as it will be in alternate examinations of the line) a dash pulse is obtained at the output of gate 32 and the staticisor device 35 is triggered so that for the remainder of the line scan period the gate 34 is inhibited and the output of the buffer 40 is obtained from the output of the device Not.

The output of buffer 40 is fed to the external apparatus through the further gate 41 which is fed with inverse $P_0$ pulses, the arrangement being such that any dash pulse occurring at the output of the buffer 40 in the first digit interval of every line is supressed.

When it is desired to write in fresh information it is arranged to write in whole words at a time, that is to say whole lines. When this is being done it is arranged that no signal occurs during the first digit interval of each line and a fresh word is always written-in in its correct form, that is to say "0" digits are written in as 0's. Thus when a word is in its correct state on the storage surface the initial pulse is zero (producing a positive charge) and hence on the next regeneration the word will be generated in the reverse sense.

The fresh information is written in by applying appropriately-timed, negative-going dash pulses to a terminal 75 (Figs. 1 and 3), these pulses being fed to the control grid of the valve 64 of Fig. 3 through a diode 76. It is also necessary to interrupt the regenerative loop coupling the pick-up electrode 20 with the control grid 12 of Fig. 1 in order to prevent regeneration of existing charges. In the arrangement described in the specification of patent application Serial No. 165,262, already referred to, the loop is interrupted by applying negative voltage to an erase terminal at 77 in Fig. 2 and so cutting off the valve 69.

When operating the present invention, however, this means of interrupting the regenerative loop will not achieve the desired purpose since the effect will be to cause a dash to be applied to the terminal 61 in Fig. 3, instead of no signal, owing to the action of the Not device.

In order to permit the writing of fresh information it is necessary to provide means which prevent a dash pulse at terminal 61, Fig. 3, from being effective. One way, illustrated in Fig. 3, involves the provision of a diode 78, a triode 79, and a resistor 80 connected as shown. There is applied at 81 to the control grid of the triode 79 a voltage which normally cuts off the anode current in this valve and the diode 78 is then non-conducting. When fresh information is to be written-in, the potential of the terminal 81 is suitably raised to render the diode 78 conducting and thus clamp the potential at the terminal 61 and the control grid of valve 64.

The gate 32 opened by pulses $P_0$ constitutes voltage responsive means which generate at each scan an identifying voltage defining which of the two output voltages at the pick-up plate 20 is representative of a given one of the two digits. The identifying voltage determines the setting of the staticisor 35 which in turn determines which of the gates 34 and 39 is open and hence from which side of the Not device 31 the output to the gate 41 is derived.

It will be appreciated that an advantage offered by the invention is that every digit area on the recording surface is frequently treated as a "0" digit area and a "1" digit area in turn whereby undesirable effects due to a protracted preponderance of relatively positively charged areas are avoided.

Although the invention has been described with particular reference to serial systems, its advantages are readily realised, as will be apparent to those versed in the art, in parallel-operating systems.

I claim:

1. Apparatus for storing binary digits comprising a cathode ray tube, an electric charge-retaining storage surface in said tube, means scanning the electron beam of said tube repetitively over digit storage areas on said storage surface, electron beam-controlling means responsive to a first and a second control voltage to generate a first and a second charge condition on two of said digit storage areas respectively, a pick-up plate capacitively coupled to said storage surface and having generated therein first and second output voltages corresponding respectively to said first and second charge conditions, and means coupling said pick-up plate to said electron beam-controlling means to generate from said output voltages control voltages to regenerate charge conditions on said storage surface, said coupling means including reversing means generating from said first and second output voltages second and first control voltages respectively, whereby at each regeneration of each digit storage area the one of the two charge conditions thereon is changed to the other.

2. Apparatus according to claim 1 comprising voltage responsive means generating at each of said scans an identifying voltage defining which of said two output voltages is representative of said two digits respectively, an output terminal, a circuit coupling said pick-up plate to said output terminal, a voltage reversing device in said circuit operable to change one of said two output voltages to the other, and means coupling said voltage responsive means to said voltage reversing device to apply said identifying voltage to operate said voltage reversing device when appropriate, whereby a given voltage at said output terminal is always representative of the same one of said charge conditions.

3. Apparatus according to claim 2, wherein said scanning is effected in a raster of lines, wherein said voltage responsive means comprise a gate circuit, wherein said gate circuit is connected to said pick-up plate to receive voltages therefrom, and wherein means are provided to open said gate circuit at the beginning of each said line.

References Cited in the file of this patent

UNITED STATES PATENTS

| | | |
|---|---|---|
| 2,639,425 | Russell et al. | May 19, 1953 |
| 2,642,550 | Williams | June 16, 1953 |
| 2,671,607 | Williams et al. | Mar. 9, 1954 |